March 12, 1929. J. G. THOMAS 1,705,427
DEVICE FOR SWIVELING AND DIPPING HEADLIGHTS OF AUTOMOTIVE VEHICLES
Filed Jan. 2, 1926
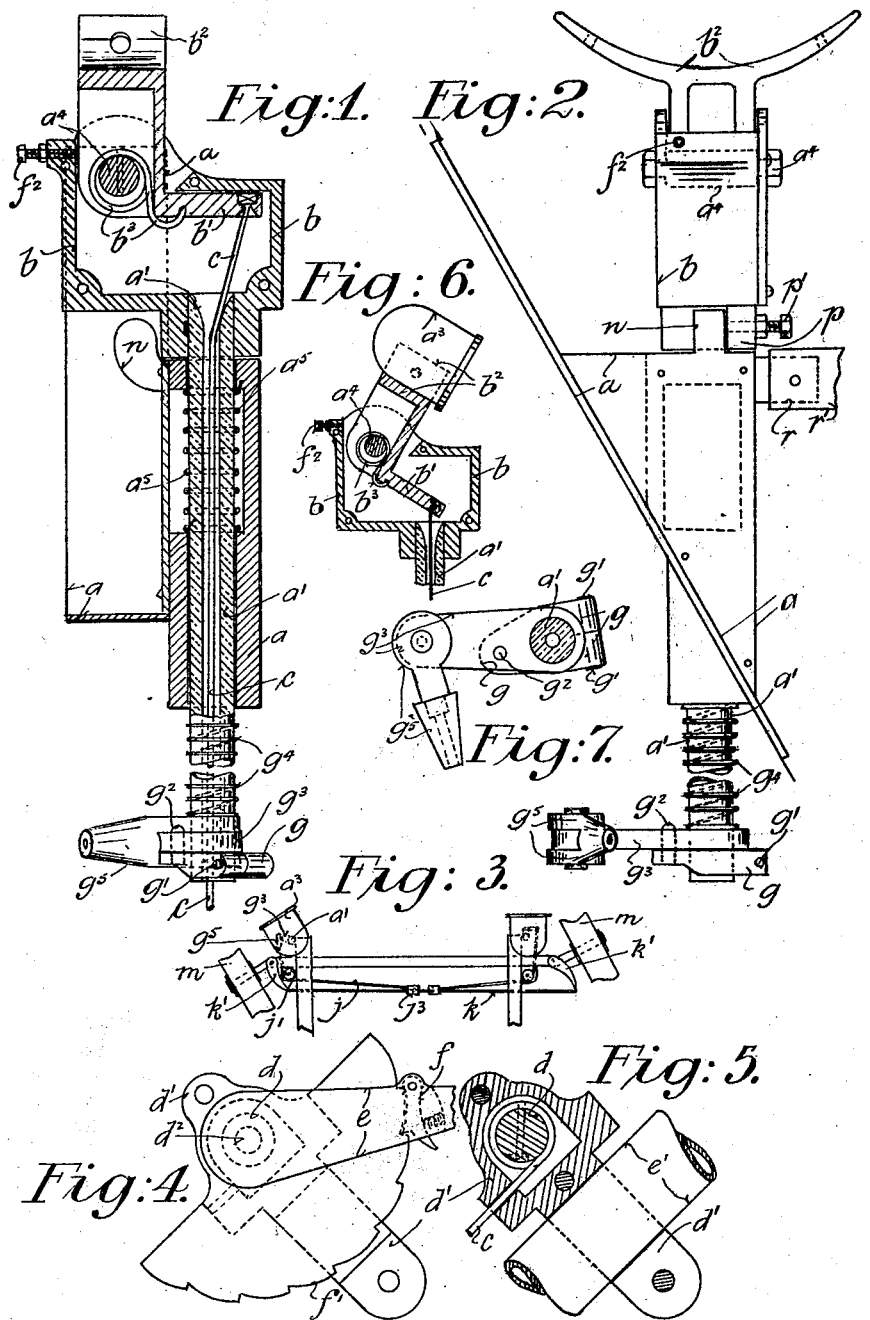
Inventor
James G. Thomas
By
James L. Norris
Attorney Patented Mar. 12, 1929.

1,705,427

UNITED STATES PATENT OFFICE.

JAMES GEORGE THOMAS, OF PERTH, WESTERN AUSTRALIA, AUSTRALIA.

DEVICE FOR SWIVELING AND DIPPING HEADLIGHTS OF AUTOMOTIVE VEHICLES.

Application filed January 2, 1926. Serial No. 78,934.

Hitherto in the driving of automotive vehicles during night time, much trouble and danger has been experienced inasmuch as when it is desired to turn a corner, the latter remains in darkness until same has been actually turned. Further, when two vehicles are proceeding in opposite directions, much trouble and danger is also experienced by the blinding glare and dazzle caused by the headlights. This invention has been devised to overcome such troubles and dangers by providing means whereby either of said headlights is swiveled on a vertical axis to move in agreement with the movement of the steering gear in order to face and illuminate a dark corner as the vehicle approaches the same. The said headlights are also moved vertically to be dipped by a manually operative lever so as to overcome the glare and dazzle aforesaid without impairing the lighting efficiency of said headlights. There is also provided means whereby the headlights may be disconnected at will from the steering gear.

The invention essentially resides in the use of a bracket suitably secured on the body frame of the vehicle, which bracket freely carries a hollow rod, on the upper end of which a casing is keyed. A seat to receive the headlight is pivoted on the upper end of said rod, so that the casing and rod as a unit are adapted to swivel on a vertical axis in agreement with the movements of the steering gear. This movement is effected by means of an arm secured to said rod and operated by a pull wire anchored by a clamp to the horizontal rod which connects the companion arms of the front wheels of the vehicle. The seat may be rocked on a horizontal axis by a spring controlled arm through a pull wire attached to a manually operative lever pivoted on a casing secured to the steering pillar or other anchorage convenient to the driver.

In order that the invention may be fully understood, the same will be described with the aid of the attached drawings, wherein:

Fig. 1 is a vertical sectional view of the bracket and associated members. Fig. 2 is a rear elevation of the same. In said views the rod is shown broken. Fig. 3 is a diagrammatic plan view showing the left hand headlight in its swiveled position in agreement with the turning of the car around a left hand corner. Fig. 4 is a side elevation of the manually operative lever and associated parts for effecting the dipping movement of the headlights and in which a part of the operative lever is shown as broken away. Fig. 5 is a side elevation of a part of the steering pillar of a vehicle having the casing of the headlight dipping lever mounted thereon, said casing being shown in section. Fig. 6 is a vertical section through the headlight support and casing which carries said support, the headlight being shown in the dipped position. Fig. 7 is a plan view of the arms and link which connect the pull wire of the swiveling rod to the steering gear.

Referring to said drawings, $a$ is a tubular bracket suitably secured to the body frame of the vehicle. A tubular rod $a^1$ extends through said tubular bracket. A spiral spring $a^5$ surrounds a portion of said tubular rod and has one of its ends engaging against the bracket $a$, the duty of said spring $a^5$ being to return the rod $a^1$ to its normal position. On the upper end of said rod $a^1$ is keyed a casing $b$ having a lateral extension and an opening in the upper portion of said extension. A curved seat $b^2$ adapted to support a headlight $a^3$ has a depending portion extending through said opening and mounted to rock on a pivot $a^4$ extending transversely of said lateral extension. The depending portion of the seat $b^2$ has a lateral arm $b^1$ which extends into the casing $b$ above the rod $a^1$. A coiled spring $b^3$, mounted on the pivot $a^4$ and of which the opposite ends engage the depending portion of the seat $b^2$ and the casing $b$, respectively, tends to return the arm $b^2$ to normal position. A pull wire $c$ having one end connected to the arm $b^1$ is threaded through the tubular rod $a^1$ and at its other end is secured to a stem $d$ working in a casing $d^1$. The casing $d^1$ is secured to the steering pillar of the vehicle and the stem $d$ is connected to the stem $d^2$ of a manually operative lever $e$, as seen in Fig. 5.

In practice, two wires for the manual operation of the right hand and left hand headlights of the vehicle are employed, the left hand wire, as $c$, only being shown in the drawings.

The manually operative lever $e$ is fitted with a spring controlled pawl $f$ to engage the ratchet teeth $f^1$ formed on the casing $d^1$. The vertical focus or tilting movement of the headlight is adjustable by the set screw $f^2$ mounted in the casing $b$ to abut against the rear portion of the headlight seat $b^2$ as shown in Fig. 1.

To the lower end of the tubular rod $a^1$ is secured an arm $g$ by the pin $g^1$, said arm being formed with an upstanding stem or pin $g^2$ which is slidable through a hole formed in an arm $g^3$ to connect the arms $g$ and $g^3$ for unitary movement. Said arm $g^3$ is slidably and rotatably mounted on the tubular rod $a^1$ and retained in operative position relatively to the arm $g$ by the said upstanding stem $g^2$ and the spiral spring $g^4$. To said arm $g^3$ is connected the hinged link $g^5$ to which is attached the pull wire $j$ which passes over a pulley $j^1$ carried on the chassis. This wire is anchored by clamp $j^3$ to the horizontal bar $k$ which connects the existing companion arms $k^1$ of the front wheels $m$ of the vehicle. This pull wire $j$ enables the left hand tubular rod $a^1$ and thereto attached members to swivel in agreement with the movements of the steering gear, it being apparent that each headlight is fitted with its own operative members.

The object of the arm $g^3$ being slidably and rotatably mounted on the rod $a^1$ is to permit it to be manually placed to the rear of the stem $g^2$ and to render the rod and its headlight inoperative during daytime, that is, to disconnect the rod from the steering gear.

The return movement of the headlight is limited by a lug $n$ formed on the bracket $a$ and adapted to engage with a similar lug $p$ formed on the casing $b$, the horizontal focus of the headlight being rendered adjustable by the set screw $p^1$ carried by said lug $p$ and abutting against the lug $n$.

The bracket $a$ is made with a projectional lug $r$ to which a horizontal stay bar $r^1$ is secured to insure rigidity with the companion or right hand bracket.

The use and operation of the invention will now be described in relation to a left hand headlight.

Assuming that it is desired to turn a corner of a street or road on the left hand side, the driver, through the steering wheel, turns the vehicle in such direction, which action, by the agency of the steering gear and thereto connected bar $k$, will cause the left hand pull wire $j$ to operate and swing the tubular rod $a^1$, consequently causing the casing $b$ and its headlight $a^3$ to move in a horizontal plane and face the corner intended to be turned by the vehicle, thereby illuminating the roadway at such corner and prior to the vehicle having actually turned the same.

It is obvious that as soon as the vehicle resumes its straight course, the headlight will also resume its normal position in agreement with the return movement of the steering gear, and urged by the spring $a^3$.

When it is desired to dip the headlights $a^3$ upon the approach of a vehicle proceeding in an opposite direction, the driver raises the manual lever $e$ on the steering pillar $e^1$ and, through the pull wire $c$ and the arm $b^1$, frontwardly deflects the seat $b^2$ and thereon headlight $a^3$ to the position seen in Fig. 6, the spring controlled pawl $f$ retaining the lever $e$ in the dipped position at the discretion of the driver.

Upon the release of the said pawl $f$, the manual lever $e$ is depressed, thus relaxing the pull wire $c$ and allowing the seat $b^2$ and thereon headlight $a^3$ to resume its normal position, as shown in Fig. 1, being urged thereto by the spring $b^3$.

What I claim as my invention and desire to secure by Letters Patent is:—

1. In a headlight structure for automotive vehicles, the combination of a bracket adapted to be attached to the vehicle, a sleeve rotatably mounted to swivel in said bracket about a vertical axis, a headlight mounted on the upper end of said sleeve to rotate therewith and also to tilt on a horizontal axis, the headlight having an operating arm fixed thereto, a spring acting on said arm to normally hold the headlight in a predetermined position on its horizontal axis, an arm fast to the lower end of the sleeve, a second arm slidably and rotatably mounted on said sleeve adjacent said last arm, cooperative means for detachably connecting the arms for movement in unison, a spring for holding the second arm toward the fast arm with said cooperative means engaging and to permit the second arm to be disengaged at will from the fast arm, means connecting the rotatable arm to the steering mechanism of the vehicle, a flexible member extending axially through the sleeve and connected to said operating arm for tilting the headlight on its horizontal axis and against the action of its spring, and a manually operative lever connected to said flexible member for actuating the same and the operating arm.

2. A dirigible headlight including a support, a shaft journaled therein, a headlight connected to the upper end of said shaft, an arm fast to the lower end of said shaft, a second arm mounted slidably and rotatably upon the lower end of the shaft and above and adjacent to the fast arm, a spring for holding the second arm toward the fast arm, and cooperable means carried by both arms, whereby the second arm can be made movable with the fast arm or vice versa.

3. A dirigible headlight including a support, a shaft journalled therein, a headlight connected to the upper end of said shaft, an arm fast to the lower end of said shaft, a second arm slidably and rotatably mounted upon the lower end of said shaft above and adjacent to the fast arm and capable of movement toward and from the fast arm, a spring for holding the second arm toward the fast arm, said second arm being provided with an aperture therethrough, and a pin projecting from the upper face of the fast arm and normally engaging the aperture to lock the arms for unitary movement, and whereby the second arm may be disengaged for independent action.

In testimony whereof I have hereunto set my hand.

JAMES GEORGE THOMAS.